US009727630B2

(12) United States Patent  (10) Patent No.: US 9,727,630 B2
Gorman et al.  (45) Date of Patent: Aug. 8, 2017

(54) DYNAMIC CONTENT DELIVERY FOR REAL-TIME TRENDS

(71) Applicant: Microsoft Corporation, Redmond, WA (US)

(72) Inventors: Robert Paul Gorman, Woodinville, WA (US); Marc David Diamond, Renton, WA (US); Sonam Dalal, Bellevue, WA (US); Chika Uchendu, Ann Arbor, MI (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 551 days.

(21) Appl. No.: 14/183,418

(22) Filed: Feb. 18, 2014

(65) Prior Publication Data

US 2015/0234912 A1  Aug. 20, 2015

(51) Int. Cl.
*G06F 7/00* (2006.01)
*G06F 17/30* (2006.01)
*G06Q 30/02* (2012.01)

(52) U.S. Cl.
CPC ... *G06F 17/30598* (2013.01); *G06Q 30/0202* (2013.01); *G06Q 30/0241* (2013.01)

(58) Field of Classification Search
None
See application file for complete search history.

(56) References Cited

U.S. PATENT DOCUMENTS 6,889,054 B2 * 5/2005 Himmel ............... H04L 29/06
455/414.1
8,086,624 B1  12/2011 Hubinette
(Continued)

FOREIGN PATENT DOCUMENTS

CN  101231640 A  7/2008

OTHER PUBLICATIONS

"International Search Report and Written Opinion Received for PCT Patent Application No. PCT/US2015/015084", Mailed Date: Apr. 17, 2015, 10 Pages.
(Continued)

*Primary Examiner* — Jau-Shya Meng
(74) *Attorney, Agent, or Firm* — Goff Patent Law PLLC; Jared S. Goff (57) ABSTRACT

Systems and methods for serving dynamic content (such as advertisements) in response to dynamic content requests are presented. More particularly, systems and methods for serving dynamic content from dynamic content portfolios directed to trending events and/or topics are presented. Upon receiving a dynamic content request, content classifications corresponding to the requested, published content (i.e., the requested content) that included reserved dynamic content space which initiated the dynamic content request are determined. A current trend is identified in a content classification when the dynamic content request volume for the current trend period exceeds the standard/expected dynamic content request volume for the current trend period by at least a threshold amount. When a trend is detected, candidate content portfolios directed to the trending content classification are selected from a set trending content portfolios. A content creative is selected from the candidate content portfolios and returned to the requesting computer user.

20 Claims, 6 Drawing Sheets

(56) References Cited

U.S. PATENT DOCUMENTS

| | | | |
|---|---|---|---|
| 8,645,209 B2* | 2/2014 | Mandyam | G06Q 30/0256 705/14.49 |
| 2007/0100875 A1 | 5/2007 | Chi et al. | |
| 2009/0089169 A1 | 4/2009 | Gupta et al. | |
| 2010/0082428 A1 | 4/2010 | Vassilvitskii et al. | |
| 2010/0198655 A1 | 8/2010 | Ketchum et al. | |
| 2011/0264581 A1* | 10/2011 | Clyne | G06Q 20/10 705/39 |
| 2011/0320715 A1 | 12/2011 | Ickman et al. | |
| 2012/0158461 A1 | 6/2012 | Aldrey et al. | |
| 2012/0166416 A1* | 6/2012 | Murdock | G06F 17/3087 707/711 |
| 2012/0303464 A1 | 11/2012 | Gorman et al. | |
| 2013/0151334 A1 | 6/2013 | Berkhin et al. | |
| 2015/0149539 A1* | 5/2015 | Shukla | H04L 67/22 709/204 |
| 2015/0213119 A1* | 7/2015 | Agarwal | G06Q 10/10 707/737 |

OTHER PUBLICATIONS

"Bottlenose Nerve Center™", Published on: Oct. 22, 2013, Available at: http://bottlenose.com/product.

"Second Written Opinion Issued in PCT Application No. PCT/US2015/015084", Mailed Date: Feb. 5, 2016, 6 Pages.

"International Preliminary Report on Patentability Issued in PCT Application No. PCT/US2015/015084", Mailed Date: May 3, 2016, 7 pages.

* cited by examiner

DYNAMIC CONTENT DELIVERY FOR REAL-TIME TRENDS

BACKGROUND

With the Internet and social media accelerating the rate at which newsworthy and popular topics or events are disseminate throughout the population of online users, businesses are increasingly interested in identifying and acting upon these emerging trends to get their messages and content, and to associate their brands with specific trending topics/events. The challenge is to identify rapidly emerging topics and trends and leverage the opportunities that they present. For example, businesses find it challenging to get in front of emerging trends and events with product offerings and advertisement campaigns and leverage these transient opportunities to their benefit For those topics and events that occur on a periodic basis or those where there is sufficient advance notice, content publishers are typically able to obtain advertisements from advertisers can purchase and place them with published content of the topics/events. However, in the case of rapidly emerging topics and/or events, it is currently not possible for the publisher to fully monetize or for the marketer to fully leverage this opportunity.

SUMMARY

The following Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

Systems and methods for serving dynamic content in response to dynamic content requests are presented. More particularly, systems and methods for serving dynamic content from dynamic content portfolios directed to trending events and/or topics are presented. Upon receiving a dynamic content request, content classifications corresponding to the published content (i.e., the requested content) that included dynamic content space which initiated the dynamic content request are determined. A current trend is identified in a content classification when the dynamic content request volume for the current trend period exceeds the standard/expected dynamic content request volume for the current trend period by at least a threshold amount. When a trend is detected, candidate content portfolios directed to the trending content classification are selected from a set trending content portfolios. A dynamic content creative is selected from the candidate content portfolios and returned to the requesting computer user.

According to aspects of the disclosed subject matter, a computer-implemented method for responding to a dynamic content request in regard to the display of content to a user is presented. According to the method and in response to the dynamic content request, one or more content classifications of the content are identified. A current trend, based on the dynamic content request volume (DCRVDCRV) in at least one of the content classifications of the content, is detected. A set of candidate content portfolios from a plurality of trending content portfolios is identified. In regard to the trending content portfolios campaigns, the trending content portfolios are identified only upon the detection of a current trend based the DCRV of the at least one content classifications. A content portfolio from the set of candidate content portfolios is selected and a dynamic content creative of the selected content portfolio is obtained. The selected dynamic content is returned to the requesting user.

According to additional aspects of the disclosed subject matter, computer-readable media bearing computer-executable instructions which, when executed on a computing system comprising at least a processor, carry out a method for responding to an dynamic content request in regard to the display of content to a user, are presented. In response to a dynamic content request, one or more content classifications of the content are identified. A current trend, based on the dynamic content request volume (DCRV) in at least one of the content classifications of the content, is detected. A set of candidate content portfolios from a plurality of trending content portfolios is identified. In regard to the trending content portfolios, the trending content portfolios are identified only upon the detection of a current trend based the DCRV of the at least one content classifications. Each content portfolio of the set of candidate content portfolios includes an indication of a revenue amount for placing a dynamic content creative on the content displayed to the user. A content portfolio from the set of candidate content portfolios is selected and a dynamic content creative of the selected content portfolio is obtained. The selected dynamic content creative is returned to the requesting user.

BRIEF DESCRIPTION OF THE DRAWINGS

The foregoing aspects and many of the attendant advantages of the disclosed subject matter will become more readily appreciated as they are better understood by reference to the following description when taken in conjunction with the following drawings, wherein.

DETAILED DESCRIPTION

For purposes of clarity, the use of the term "exemplary" in this document should be interpreted as serving as an illustration or example of something, and it should not be interpreted as an ideal and/or a leading illustration of that thing.

The use of the term "content" should be viewed as any content that is displayable and/or presentable to a computer user. Content will typically include one or more reserved spaces (i.e., locations reserved with an item of content) into which one or more items of dynamic content are placed. Content may be textual documents, images, audio, and/or video, or a combination of these. The content will include information and/or code with regard to the reserved spaces such that, upon display (or presentation) of the content to the computer user on a computer system, a dynamic content request will be made to an messaging service for dynamic content to be placed in the reserved dynamic content space. The dynamic content providing service will return information regarding a dynamic content creative for display in the reserved content space. A content publisher is one that makes content available on the network such that a computer user can retrieve the content and display the same on his/her computer.

The term dynamic content request volume (DCRV) refers to the amount of dynamic content requests that a messaging service receives in regard to published content of a particular content classification during a predetermined time period. A trend occurs when the dynamic content request volume for content of a given content classification exceeds, by some predetermined amount, an average (or expected) DCRV for that content classification during the predetermined time period.

For purposes of clarity, a brief, general description is provided. Generally speaking, content publishers typically publish content with space reserved for dynamic content (i.e., space in which dynamic content will be placed.) Additionally, these content publishers will typically contract with a dynamic content publishing service to manage the reserved dynamic content spaces in the published content, i.e., provide dynamic content to be placed in the reserved content space when the content is requested and displayed to a computer user. Often, this arrangement will include a financial incentive to the content publisher from the messaging service. For its part, the content publisher will include information (code, references, hyperlinks, etc.) in the content (typically in association with the reserved dynamic content space) that will generate a dynamic content request to the dynamic content providing service when a computer user retrieves and, more particularly, displays the requested content.

To provide dynamic content, the dynamic content providing service will contract with various dynamic content providers. In particular, the dynamic content providing service obtains one or more dynamic content portfolios from the various dynamic content providers. When the dynamic content providing service receives a dynamic content request, based on the subject matter of the requested content (i.e., the content requested from the content publisher by the computer user) and information regarding the requesting user (i.e., the computer user that requested the content which caused the dynamic content request) the dynamic content providing service identifies a set of candidate dynamic content portfolios whose dynamic content could be used to fulfill the request. The dynamic content providing service then selects a "winning" content portfolio from the candidates and obtains information regarding a "dynamic content creative" (i.e., the dynamic content that is displayed to the user with the requested content) from the winning/selected content portfolio. Information regarding the obtained dynamic content creative is used to obtain the dynamic content creative from where it is located on the network and the dynamic content creative is returned to the requesting user, thereby satisfying the dynamic content request. On the requesting user's side, the requested content, which now includes the dynamic content creative, is displayed.

Typically, dynamic content providers will associate dynamic content campaign with a category of content such that when a dynamic content request is made with regard to requested content of a particular category (and when certain user demographics of the requesting user are met) the content portfolio is identified as a candidate content portfolio. Unfortunately, trending topics and/or events are not often contained within a single content category. For example, a trending topic may be in regard to the financial success of a race car driver where the content related to the topic could found in categories such as finance, entertainment, sports, and automotive. While individually, the dynamic content request volume of each category may be moderate, the volume of each category is often insufficient to rise to the level of a "trend." As a consequence, when a content portfolio is directed to a content category, the dynamic content provider may miss out on the opportunity to take advantage of one or more trends.

Figure 1:
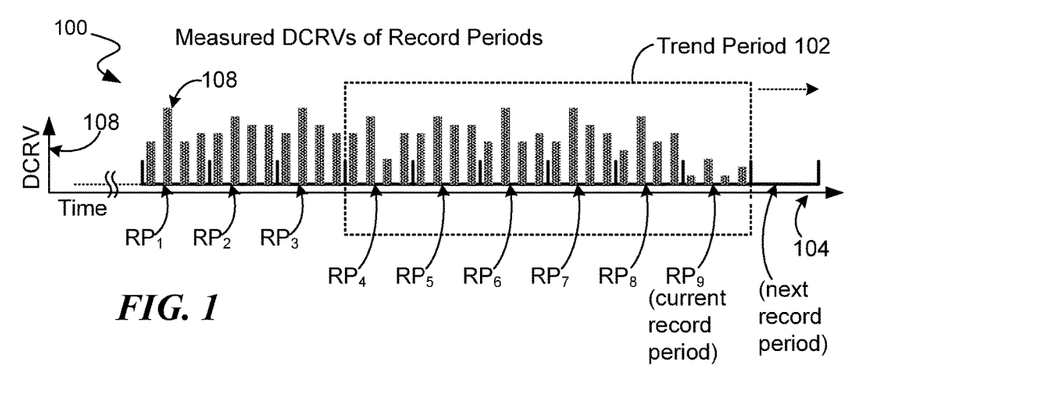
FIG. 1 illustrates a collection of exemplary record periods, organized in a 2-dimensional graph with the two dimensions being time and dynamic content request volume.

According to aspects of the disclosed subject matter, in order to take advantage of trending topics and events, published content is classified into one or more content classifications—where the classifications are independent of content categories. While content classifications are independent of content categories, a particular item of published content may be both classified and categorized. To more fully illustrate how content classifications are used in identifying trending topics and/or events, reference is now made to FIG. 1. FIG. 1 illustrates a collection 100 of exemplary record periods $RP_1$-$RP_9$, organized in a 2-dimensional graph with the two dimensions being time 104 and dynamic content request volume 106. Each exemplary record period includes counts (as indicated in FIG. 1 by the bars in each record period, such as bar 108) indicating the dynamic content request volume according to content classifications received by the messaging service during the recording period. For illustration purposes the record periods $RP_1$-$RP_9$ of FIG. 1 include counts for four content classifications. However, this should be viewed as illustrative and not limiting upon the disclosed subject matter. In an actual embodiment, the record periods may include any number of content classifications. A record period may correspond to any length of time, such as (by way of illustration and not limitation) 5 minutes, 15 minutes, 1 minute, 30 minutes, and the like.

As indicated above, a trend occurs when the dynamic content request volume (DCRV) for content of a given content classification exceeds, by some predetermined amount, an average (or expected) DCRV for a content classification during a predetermined time period. This predetermined time period is referred to hereafter as a trend period, such as trend period 102. A trend period encompasses one or more record periods (typically a predetermined number of record periods) and the dynamic content request volume is the aggregate of the dynamic content request volumes of the encompassed record periods. At the expiration of the time corresponding to a record period, a new record period is established and the trend period is updated such that the trend period encompasses the predetermined number of record period including the new/current record period. Correspondingly, the aggregate dynamic content request volume for the trend period is updated according to the record periods encompassed in the trend period.

Figure 2:
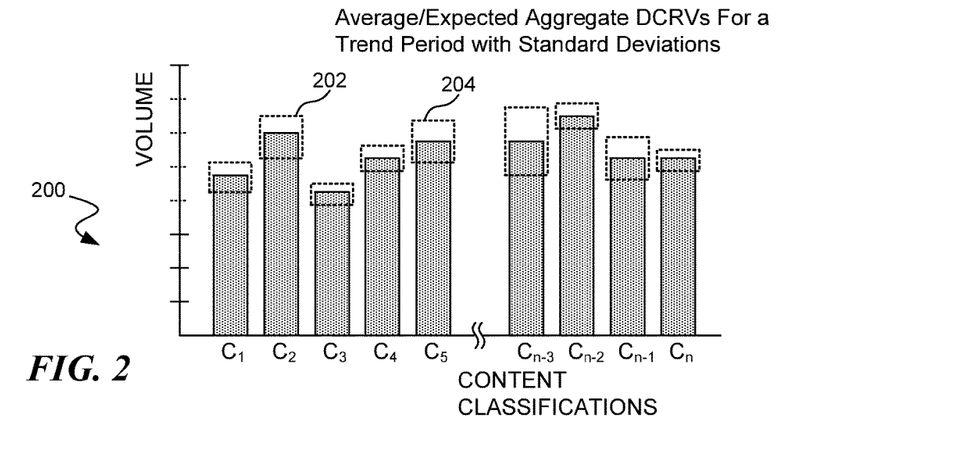
FIG. 2 illustrates an exemplary graph of average (or expected) aggregate dynamic content request volumes (DCRVs) for an illustrative trend period.

Regarding the aggregate DCRVs for a trend period, FIG. 2 illustrates an exemplary graph 200 of average (or expected) aggregate DCRVs for an illustrative trend period. As can be seen in the exemplary graph 200, there are n content classifications that are measured, comprising content classifications $C_1$-$C_n$. For illustration purposes only, the aggregate DCRV associated with each content classification is represented in FIG. 2 as a bar. In an actual embodiment, the aggregate DCRV associated with each content classification would typically be represented as a number. Also shown in FIG. 2 is the standard deviation from the average for each content classification (as represented by dashed box at the end of each content classification bar). For example, the standard deviation for the DCRV for content classification $C_2$ is represented by box 202 and the standard deviation for the DCRV for content classification $C_5$ is represented by box 204. The standard deviations of the DCRVs for each content classification may be used in determining whether an increased dynamic content request volume in a content classification constitutes a trend or not.

Figure 3:
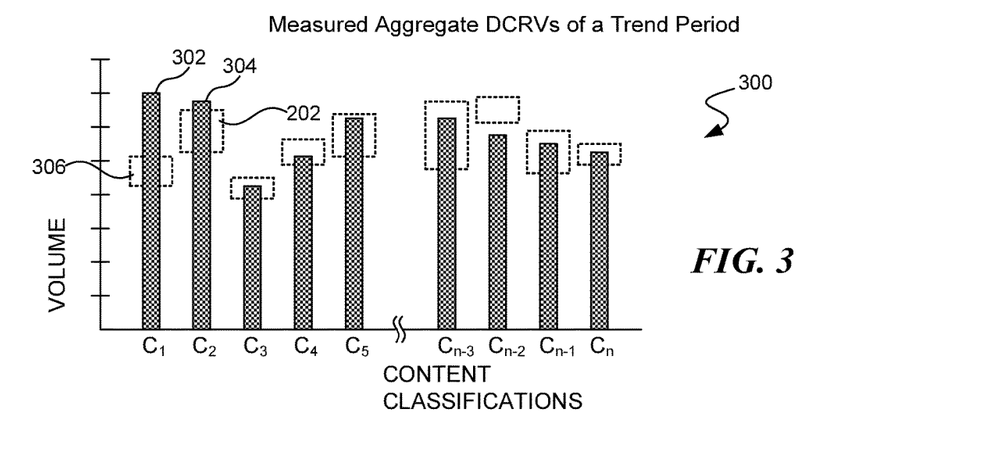
FIG. 3 illustrates an exemplary graph of measured, aggregate DCRVs of an illustrative trend period.

Turning to FIG. 3, FIG. 3 illustrates an exemplary graph 300 of measured, aggregate DCRVs of an illustrative trend period. For purposes of this exemplary graph 300, there are n content classifications that are measured, comprising content classifications $C_1$-$C_n$ corresponding to those content classifications illustrated in FIG. 2. In contrast to the expected/average DCRVs shown in FIG. 2, the DCRVs illustrated in FIG. 3 correspond to measured/actual DCRVs. For illustration purposes, also included in FIG. 3 are the dashed boxes indicating the standard deviations for each of the content classifications, such as box 306 and box 202. If the exemplary DCRVs shown in FIG. 3 corresponded to a currently measured trend period, the volumes displayed in graph 300 would represent a snapshot of the current volumes as additional dynamic content requests may be received during the current recording period, thereby increasing the aggregate volumes.

According to this snapshot of aggregate volumes (as shown in graph 300), content classified with content classification $C_1$ or $C_2$ may be identified as a current trend. More particularly, the volume associated with content classification $C_1$ substantially exceeds the standard deviation (as indicated by box 306) of the average/expected DCRV for the content classification. Similarly, the volume associated with content classification $C_2$ also exceeds the standard deviation (as indicated by box 202) of the average/expected DCRV for the content classification. As mentioned above, a trend occurs when the dynamic content request volume for content of a given content classification exceeds, by some predetermined amount, an average (or expected) DCRV for a content classification during a predetermined time period. According to various implementation details, the predetermined amount may comprise exceeding the standard deviation of the expected volume for a particular content classification. In an alternative implementation, the predetermined amount may comprise exceeding the standard deviation of the expected volume for particular content classification by some defined amount or percentage of the actual measured volume. In yet a further alternative implementation, the predetermined amount may comprise exceeding the average/expected DCRV for content classification by a defined amount and/or to find percentage of the average/expected DCRV for the content classification. Of course, these implementation configurations are illustrative of various formulas for determining whether a trend is occurring and should not be viewed as the only configurations for identifying a trend based on measured DCRV of the content classification.

Figure 4:
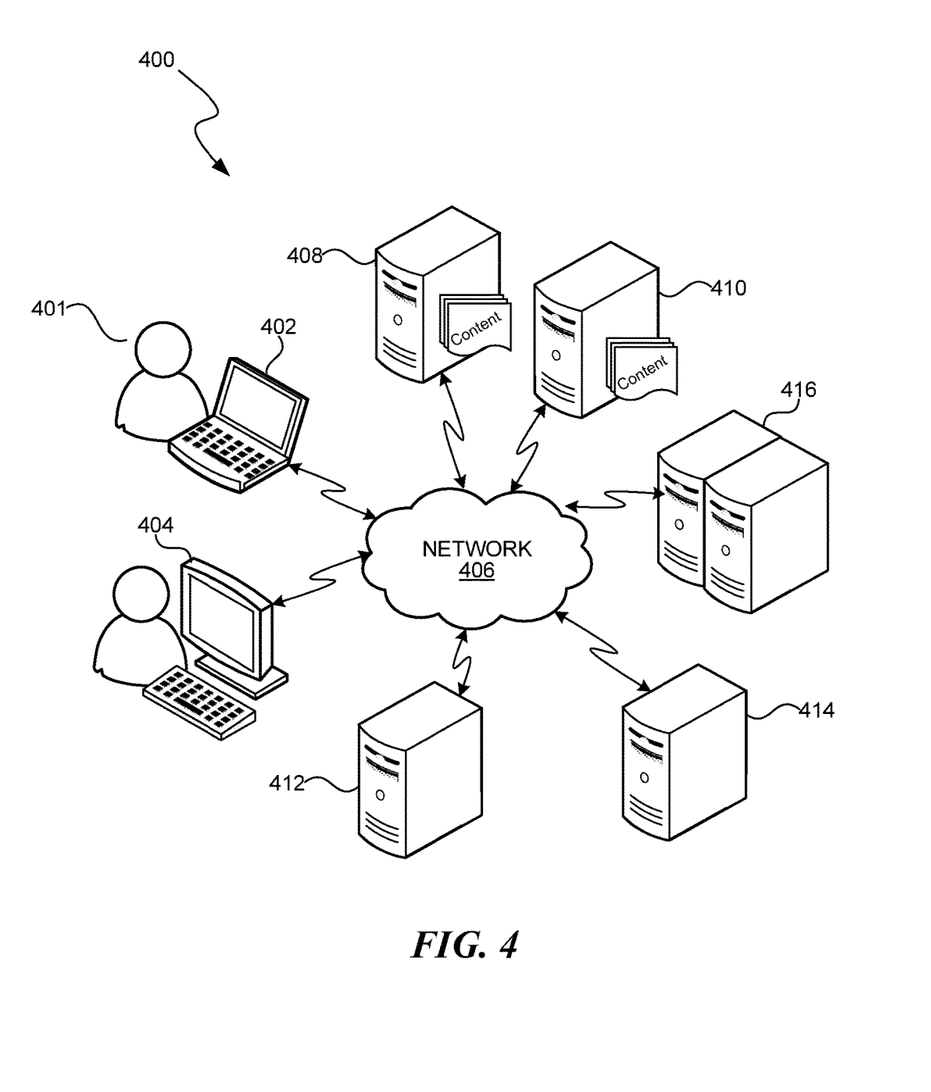
FIG. 4 is a block diagram illustrating an exemplary network environment suitable for implementing aspects of the disclosed subject matter, particularly in regard to providing dynamic content in regard to published content relating to currently trending topics and/or events.

Turning now to FIG. 4, FIG. 4 is a block diagram illustrating an exemplary network environment 400 suitable for implementing aspects of the disclosed subject matter, particularly in regard to providing dynamic content in regard to published content relating to currently trending topics and/or events. The exemplary networked environment 400 includes one or more user computers, such as user computers 402-404, connected to a network 406, such as the Internet, a wide area network or WAN, and the like. User computers include, by way of illustration and not limitation: desktop computers (such as user computer 404); laptop computers (such as user computer 402); tablet computers (not shown); mobile devices (not shown); game consoles (not shown); personal digital assistants (not shown); and the like.

The exemplary network environment 400 also includes one or more content publishers, such as content publishers 408-410. As indicated above, a content publisher is an entity (including a person, an organization, a business, and the like) that makes content available on the network 406 such that a computer user, such as computer user 401, can retrieve the content and display the same on his/her computer (such as user computer 402). Further included in the exemplary network environment 200 are dynamic content providers, including dynamic content providers 412-414. Also included in the exemplary network environment 400 one or more dynamic content providing services, including dynamic content providing service 416. As indicated above, the dynamic content providers, such as dynamic content providers 412-414, contract with a dynamic content providing service 416 to provide dynamic content, such as advertisements or other content, in relation to published content that a computer user may request from the content publisher.

According to aspects of the disclosed subject matter, in addition to establishing typical dynamic content portfolios with the dynamic content providing service 416 (as described above), dynamic content providers, such as dynamic content providers 412-414, will also establish trending content portfolios. These trending content portfolios are predicated upon content classifications rather than published content categories. As mentioned above, where content categories are hierarchical in nature, content categories may fail to identify current trends, content classifications are generally a flat arrangement. Content classifications are not limited to content of a specific category: they may reach across multiple content categories.

As suggested above, a trending content portfolio identifies one or more content classifications which, when determined to be currently trending, cause the dynamic content providing service 416 to select among the trending content portfolios (either exclusively or in combination with traditional dynamic content portfolios) to identify dynamic content to satisfy an dynamic content request. In other words, dynamic content from a trending content portfolio is selected by the dynamic content providing service 416 only when one or more content classifications associated with the trending dynamic content portfolio are determined to be trending.

Figure 5:
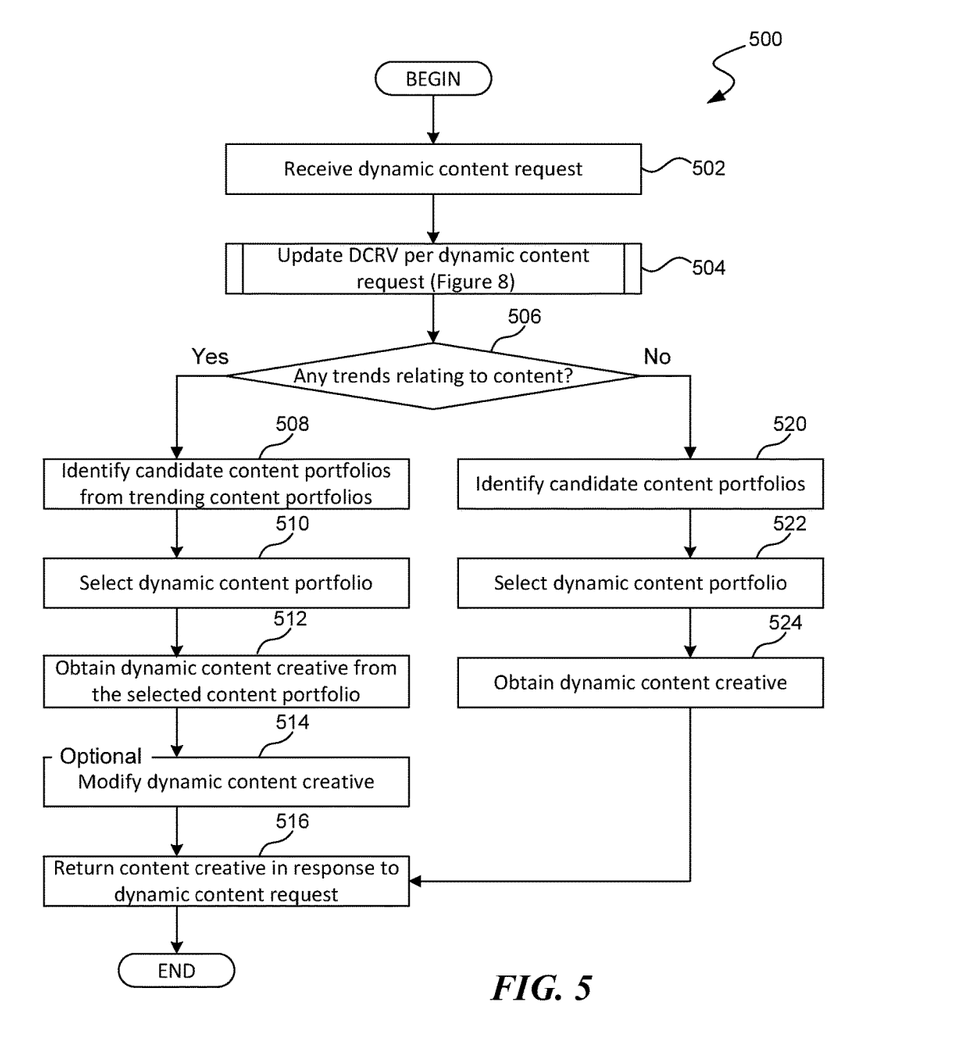
FIG. 5 is a flow diagram illustrating an exemplary routine for responding to an dynamic content request with a dynamic content creative, according to aspects of the disclosed subject matter.

In regard to identifying candidate dynamic content portfolios and selecting dynamic content portfolio from among the candidate dynamic content portfolios reference is now made to FIG. 5. FIG. 5 is a flow diagram illustrating an exemplary routine 500 for responding to a dynamic content request with a content creative, according to aspects of the disclosed subject matter. As will be readily appreciated, routine 500 is implemented by a messaging service, such as messaging service 416. In contrast to the routine described below in regard to FIG. 6, routine 500 uses only trending dynamic content portfolios when fulfilling a dynamic content request where the content corresponds to one or more trending content classifications.

Figure 8:
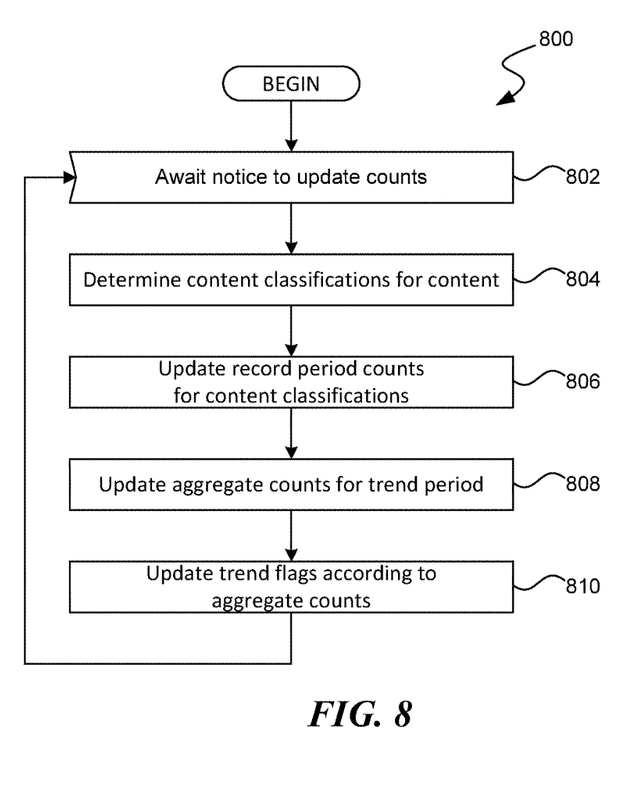
FIG. 8 illustrates an exemplary routine for updating the counts associated with the current record period and current trend period based on receiving a dynamic content request.

Beginning at block 502, a dynamic content request corresponding to requested content (i.e., the published content requested by the user that includes reserved dynamic content space) is received. At block 504, the dynamic content request volume is updated (as described below in regard to FIG. 8). At decision block 506, a determination is made as to whether there are any trends relating to the requested content. This determination may be made according to trend flags that are set in updating the dynamic content request volume (as set forth in FIG. 8) or may be determined by examining the aggregated counts for the content classifications relating to the requested content. Other methods and/or algorithms for determining whether an event or topic is trending may also be implemented. If, at decision block 506, it is determined that there are trends relating to the requested content, the routine 500 proceeds to block 508. Alternatively, if there are no trends relating to the requested content, the routine 500 proceeds to block 520.

At block 508, candidate dynamic content portfolios from the trending content portfolios are identified. At block 510, the dynamic content providing service 416 selects a content portfolio from the candidate trending content portfolios. As will be readily appreciated, the content portfolio may be selected in order to maximize revenue for the messaging service 416, according to fulfillment goals of the dynamic content portfolios, according to demographic information relating to the requesting user, a combination of these various factors, and other conditions that may exist. According to one embodiment, as part of maximizing (or at least determining) the revenue for the messaging service, a trending content portfolio may indicate a price to be paid by the dynamic content provider for placing its dynamic content on the requested, published content, where the price is determined as a function of the magnitude of the trend (or trends). This function may be a continuous function or identify discrete levels at which the dynamic content provider is willing to pay for placing dynamic content in the reserved dynamic content space. According to one embodiment, the magnitude of the trend is determined according to the aggregate dynamic content request volume of a content classification above the average/expected dynamic content request volume. By way of example and with reference again to FIG. 3, and further assuming that the dynamic content request volume for content classifications $C_1$ and $C_2$ are both viewed as trending, the magnitude of the trend for $C_1$ is substantially greater than the magnitude for the trend for $C_2$, even though the dynamic content request volume for both content classifications is nearly the same.

Returning again to FIG. 5, after selecting a content portfolio from the candidate content portfolios, at block 512 the messaging service 416 obtains a content creative from the selected content portfolio. At block 514, the content creative may be optionally modified according to the trend or trends relating to the requested content, user demographics and interests of the requesting user, time of day, day of week, season of the year, holidays, and the like. Thereafter, at block 516, the messaging service 416 returns the dynamic content creative to the requesting computer user in response to the dynamic content request. Thereafter, the routine 500 terminates.

Returning again to block 520, the dynamic content providing service 416 identifies candidate content portfolios from various dynamic content providers. At block 522, a content portfolio is selected from the candidate content portfolios to satisfy the dynamic content request. At block 524, a dynamic content creative of the selected content portfolio is obtained and, at block 516, the content creative is returned to the requesting user in response to the dynamic content request. Thereafter, the routine 500 terminates.

Figure 6:
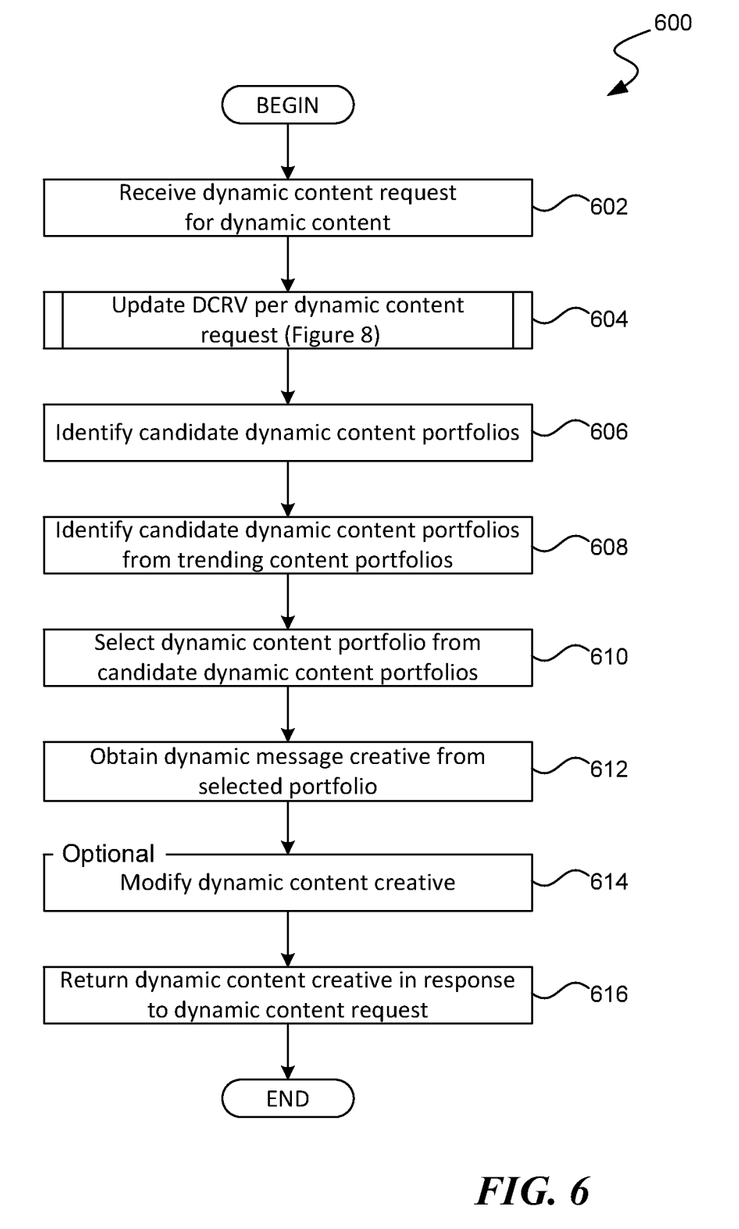
FIG. 6 is a flow diagram illustrating an exemplary routine for responding to a content request with a dynamic content creative considering both trending content portfolios as well as "standard" content portfolios.

As indicated above, routine 500 is directed to an embodiment where only trending content portfolios are considered for fulfilling a dynamic content request when the content relates to a trending topic according to one or more related content classifications. In contrast, FIG. 6 is a flow diagram illustrating an exemplary routine 600 for responding to a dynamic content request with a dynamic content creative considering both trending content portfolios as well as "standard" content portfolios.

Beginning at block 602, a dynamic content request corresponding to the requested content. At block 604, the dynamic content request volume is updated as described below in regard to FIG. 8. At block 606, the messaging service 416 identifies candidate content portfolios that could be used to satisfy the dynamic content request from the set of "standard" content portfolios (i.e., those content portfolios that are not trending content portfolios). At block 608, the messaging service 416 further identifies candidate content portfolios from among the trending content portfolios.

At block 610, and content portfolio from the combined set of candidate content portfolios is selected. This selection is the same as described above in regard to FIG. 5, and selecting a content portfolio from a set of candidate content portfolios is known in the art. At block 612, a dynamic content creative from the selective content portfolio is obtained. At block 614, the content creative is optionally modified (if the content creative is from a trending content portfolio) as discussed above in regard to routine 500 of FIG. 5. At block 616, the content creative is returned to the requesting user in response to the dynamic content request. Thereafter, routine 600 terminates.

Figure 7:
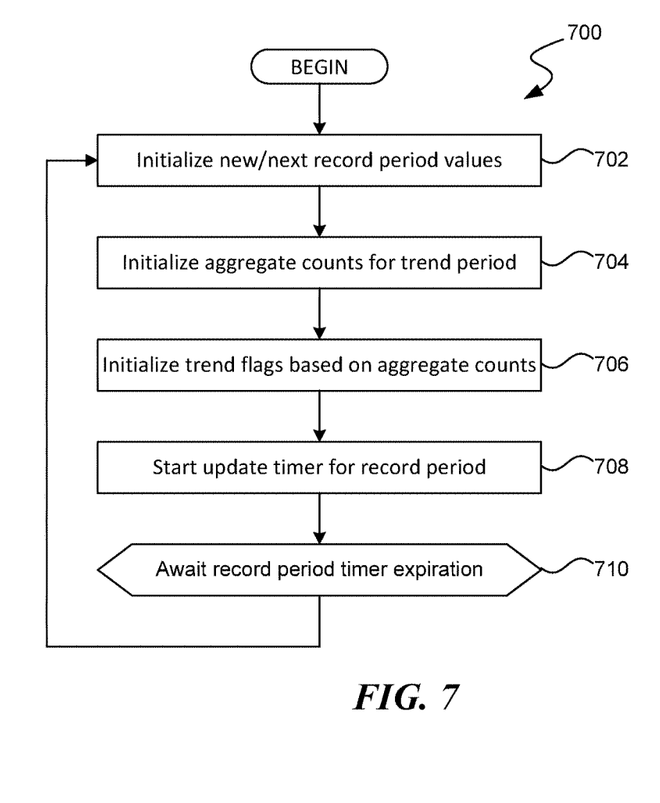
FIG. 7 is a flow diagram illustrating an exemplary routine for carrying out the process of maintaining record periods, the current trend period, and the various counts associated with them.

As indicated above, the messaging service 416 records dynamic content request volumes corresponding to various content classifications based on record periods. To maintain these record periods and the associated dynamic content request volumes, the messaging service 416 executes an process/routine. FIG. 7 is a flow diagram illustrating an exemplary routine 700 for carrying out the process of maintaining record periods, the current trend period, and the various counts associated with them. Beginning at block 702, the exemplary routine 700 initializes a new (i.e., to be the current) record period with its associated values. At block 704, the aggregate counts for the trend period are optional initialized. The aggregate counts for the trend period are based on the number of record period that are to be included in the trend period, including the newly initialized/current record period. The number of record periods to be included in the trend periods is configurable. Moreover, in at least one embodiment, trending content portfolios may identify the length of a trend period (which relates to a number of record periods.)

At block 706, trend flags associated with the aggregate counts may also be initialized. Trend flags simply and quickly indicate whether, based on the current aggregate counts a trend is occurring in any one content classification. After initializing the trend flags, at block 708 the disclaimer associated with the record period is started. Thereafter, at block 710, the routine/process 700 awaits the expiration of the timer associated with the current record period. After the timer for the current record period has expired, the routine/process 700 returns again to block 702 and repeats the above described process.

As mentioned above, FIG. 8 illustrates an exemplary routine 800 for updating the counts associated with the current record period and current trend period based on receiving a dynamic content request. At block 802, the routine 800 awaits notice to update the counts (both in the current record period and the aggregate counts for the trend period). Upon receiving notice, at block 804, the content classifications associated with the requested content (for which the dynamic content request is made) are determined. At block 806, the record period counts for each of the determined content classifications is updated (incremented). At block 808, the aggregate counts for the trend period are updated according to the updated, current record period. Similarly, at block 810, the trend flags indicating whether a trend exists in any one of the content classifications are updated according to the aggregate counts. Thereafter, the routine 800 returns again to block 802 awaiting notice of another update.

Regarding routines 500-800, while these routines/processes are expressed in regard to discrete steps, these steps should be viewed as being logical in nature and may or may not correspond to any actual and/or discrete steps of a particular implementation. Nor should the order in which these steps are presented in the various routines be construed as the only order in which the steps may be carried out. Moreover, while these routines include various novel features of the disclosed subject matter, other steps (not listed) may also be carried out in the execution of the routines. Further, those skilled in the art will appreciate that logical steps of these routines may be combined together or be comprised of multiple steps. Steps of routines 500-800 may be carried out in parallel or in series. Often, but not exclusively, the functionality of the various routines is embodied in software (e.g., applications, system services, libraries, and the like) that is executed on computing hardware and/or systems as described below in regard to FIG. 9. In various embodiments, all or some of the various routines may also be embodied in hardware modules, including but not limited to system on chips, specially designed processors and or logic circuits, and the like on a computer system.

These routines 500-800 are typically may be implemented in executable code comprising routines, functions, looping structures, selectors such as if-then and if-then-else statements, assignments, arithmetic computations, and the like. The exact implementation of each of the routines is based on various implementation configurations and decisions, including programming languages, compilers, target processors, operating environments, and the link. Those skilled in the art will readily appreciate that the logical steps identified in these routines may be implemented in any number of manners and, thus, the logical descriptions set forth above are sufficiently enabling to achieve similar results.

While many novel aspects of the disclosed subject matter are expressed in routines embodied in applications (also referred to as computer programs), apps (small, generally single or narrow purposed, applications), and/or methods, these aspects may also be embodied as computer-executable instructions stored by computer-readable media, also referred to as computer-readable storage media. As those skilled in the art will recognize, computer-readable media can host computer-executable instructions for later retrieval and execution. When the computer-executable instructions store stored on the computer-readable storage devices are executed, they carry out various steps, methods and/or functionality, including those steps, methods, and routines described above in regard the various routines. Examples of computer-readable media include, but are not limited to: optical storage media such as Blu-ray discs, digital video discs (DVDs), compact discs (CDs), optical disc cartridges, and the like; magnetic storage media including hard disk drives, floppy disks, magnetic tape, and the like; memory storage devices such as random access memory (RAM), read-only memory (ROM), memory cards, thumb drives, and the like; cloud storage (i.e., an online storage service); and the like. For purposes of this disclosure, however, computer-readable media expressly excludes carrier waves and propagated signals.

Figure 9:
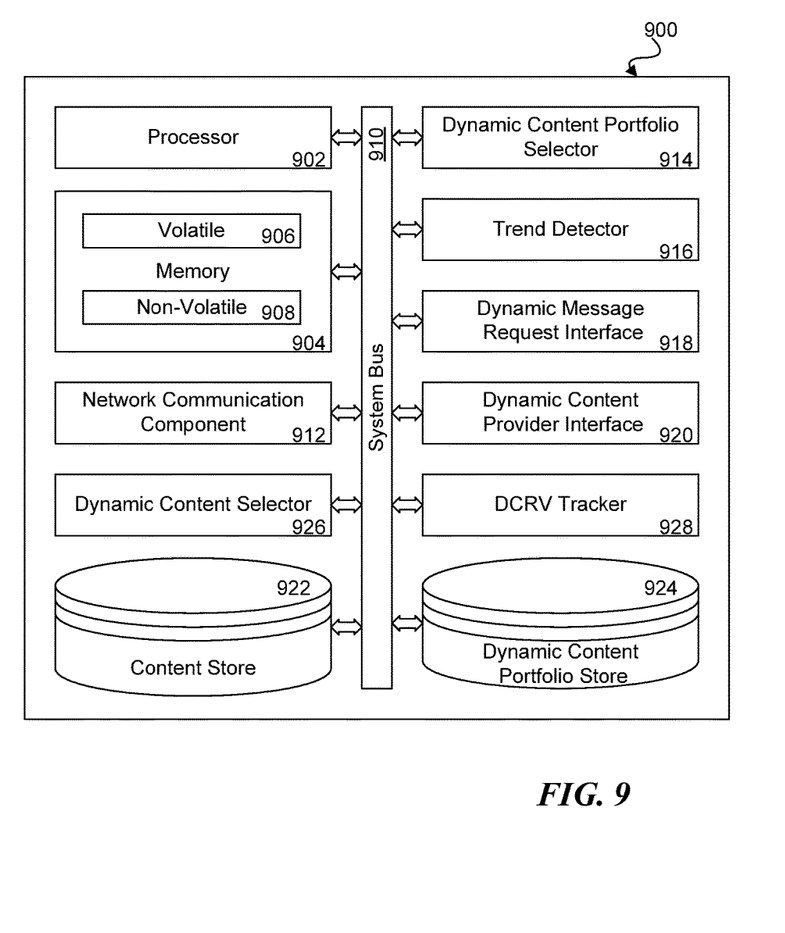
FIG. 9 is a block diagram illustrating an exemplary computer system suitable for implementing a messaging service configured according to aspects of the disclosed subject matter.

FIG. 9 is a block diagram illustrating an exemplary computer system 900 suitable for implementing a messaging service 416 configured according to aspects of the disclosed subject matter. The exemplary computer system 900 includes a processor 902 (or processing unit) and a memory 904 interconnected by way of a system bus 910. As discussed above, the memory 904 typically (but not always) comprises both volatile memory 906 and non-volatile memory 908. Volatile memory 906 retains or stores information so long as the memory is supplied with power. In contrast, non-volatile memory 908 is capable of storing (or persisting) information even when a power supply is not available. Generally speaking, RAM and CPU cache memory are examples of volatile memory 906 whereas ROM and memory storage devices and/or cards are examples of non-volatile memory 908.

The processor 902 executes instructions retrieved from the memory 904 in carrying out various functions, particularly in regard to implementing a messaging service 416 as described above. The processor 902 may be comprised of any of various commercially available processors such as single-processor, multi-processor, single-core units, and multi-core units. Moreover, those skilled in the art will appreciate that the novel aspects of the disclosed subject matter may be practiced with other computer system configurations, including but not limited to: desktop computers, mini- and mainframe computers, multi-computer systems, distributed computer systems, and the like; etc.

The system bus 910 provides an interface for the various components of the mobile device to inter-communicate. The system bus 910 can be of any of several types of bus structures that can interconnect the various components (including both internal and external components). The computer system 900 further includes a network communication component 912 for interconnecting the messaging service 416/computer system 900 with other computers and/or network entities (including, but not limited to, user computers such as user computers 402-404, content publishers 408-410, and dynamic content providers 412-414) as well as other devices on the computer network 406. The network communication component 912 may be configured to communicate with the various computers and devices over the network 108 via a wired connection, a wireless connection, or both.

The computing system 900 also includes a dynamic content request interface 918, a content portfolio selector 914, a dynamic content selector 926, a trend detector 916, and a DCRV tracker. The dynamic content request interface 918 is an external interface by which the dynamic content providing service 416, as implemented on the computing system 900, interfaces with user requests, both in receiving dynamic content requests from requesting users (in regard to published content) and returning dynamic content creatives. The dynamic content request interface 918 relies upon the content portfolio selector 914 to identify candidate dynamic content portfolios that could satisfy a received dynamic content request from a plurality of content portfolios stored in a content portfolio store 924. The dynamic content portfolio selector 914 works in conjunction with the trend detector 916 to determine whether there is a current trend with regard to one or more content classifications of the requested content. For efficiency purposes, the trend detector 916 may store the content classifications of requested content in a content store 922, rather than determining the classifications each time a dynamic content request is generated in regard to displaying the requested content. The dynamic content selector 926 selects candidate dynamic content (or a dynamic content creative) from the selected dynamic content portfolio and, when it is determined to be a trending dynamic content portfolio, may optionally modify the content creative according to the current detected trend.

The DCRV track 928 monitors the dynamic content request volumes with regard to the various content classifications with regard to the various time periods.

The dynamic content provider interface 920 interacts with dynamic content providers to obtain content portfolios, including trending content portfolios. The content portfolios includes the conditions upon which a dynamic content creative associated with the content portfolio may be selected, including requesting user demographics, campaign budgets, dynamic content creative information, content category or categories, price for displaying a dynamic content creative, and for trending content portfolios they also include content classification or classifications. These content portfolios are stored in the content portfolio store 924.

Regarding the various components of the exemplary computing device 900, those skilled in the art will appreciate that these components may be implemented as executable software modules stored in the memory of the computing device, as hardware modules (including SoCs—system on a chip), or a combination of the two. Moreover, each of the various components may be implemented as an independent, cooperative process or device, operating in conjunction with one or more computer systems. It should be further appreciated, of course, that the various components described above in regard to the exemplary computing device 700 should be viewed as logical components for carrying out the various described functions. As those skilled in the art will readily appreciate, logical components and/or subsystems may or may not correspond directly, in a one-to-one manner, to actual, discrete components. In an actual embodiment, the various components of each computer system may be combined together or broke up across multiple actual components and/or implemented as cooperative processes on a computer network.

While delivering dynamic content in response to a dynamic content request may be implemented in various embodiments, in an actual embodiment, the dynamic content request may correspond to an advertisement request. In particular, many content publishers include reserved space for advertisements in their online content. When a computer user requests and displays content that includes the advertisements (or code associated with the reserved space for displaying an advertisement) an advertisement request is made of a dynamic content providing service, i.e., an advertising service. The advertising service determines whether there is a current trend in regard to the one or more classifications of the requested content. As discussed in regard to routines 500 and/or 600, the advertising service will identify dynamic content portfolios/advertisement campaigns and return an advertisement creative to be displayed Of course, while advertising is one embodiment in which the disclosed subject matter may be specifically applied, it should not be viewed as the sole or limited example. It should be appreciated that the disclosed subject matter may be practically and suitably applied to any number of other specific embodiments.

While various novel aspects of the disclosed subject matter have been described, it should be appreciated that these aspects are exemplary and should not be construed as limiting. Variations and alterations to the various aspects may be made without departing from the scope of the disclosed subject matter.

What is claimed:

1. A computer implemented method, the method comprising each of the following as executed on a computer system:
   receiving, via one or more computer processors in a computer system, a dynamic content request for content;
   identifying, via the one or more computer processors in a computer system, one or more content classifications of the content;
   detecting, via one or more computer processors in the computer system, at least one current trend based on dynamic content request volume (DCRV) in at least one of the one or more content classifications of the content;
   in response to the detecting, identifying, via one or more computer processors in the computer system, a set of candidate content portfolios, with the identifying comprising determining the candidate content portfolios are classified in the one or more content classifications of the content, with the one or more classifications being the one or more classifications upon whose DCRV the at least one current trend is based;
   selecting, via one or more computer processors in the computer system, a content portfolio from the set of candidate content portfolios to maximize revenue to be paid in exchange for placing a dynamic content creative for display, wherein each content portfolio of the set of candidate content portfolios includes an indication of a revenue amount to be paid in exchange for placing a dynamic content creative for display, with the selecting comprising determining the revenue amount as a function of at least one characteristic of the at least one current trend;
   obtaining, via one or more computer processors in the computer system, a dynamic content creative of the selected content portfolio; and
   in response to the dynamic content request, providing, via one or more computer processors in the computer system, information regarding the obtained dynamic content creative.

2. The method of claim 1 further comprising modifying the dynamic content creative based on the at least one content classification.

3. The method of claim 1, wherein obtaining a dynamic content creative of the selected content portfolio comprising obtaining a dynamic content creative from a plurality of dynamic content creatives of the selected content portfolio.

4. The method of claim 3, wherein the obtained dynamic content creative is obtained from the plurality of dynamic content creatives according to one or more of user demographics, the at least one content classifications, and magnitude of the at least one current trend.

5. The method of claim 1, wherein each trending content portfolio indicates one or more content classifications, and wherein the method comprises determining a content classification of a content portfolio is a trending content classification, and including the content portfolio as a dynamic content portfolio in the set of candidate content portfolios based at least in part on the determination the content classification of the trending content portfolio is a trending content classification.

6. The method of claim 1, wherein detecting the at least one current trend based on the DCRV in at least one of the content classifications of the content comprises determining that the DCRV of the at least one content classification exceeds a standard DCRV for the at least one content classification by at least a threshold amount.

7. The method of claim 6, wherein the threshold amount comprises a standard deviation from an average of the DCRV of the at least one content classification for a current time period.

8. The method of claim 6, wherein the threshold amount comprises a predetermined percentage of the DCRV of the at least one content classification for a current time period.

9. The method of claim 1, wherein the selecting comprises determining the revenue amount as a function of a current magnitude of the at least one current trend.

10. The method of claim 1, wherein the selecting comprises determining the revenue amount as a function of a number of unique users participating in the at least one current trend.

11. One or more computer readable storage media bearing computer executable instructions which, when executed on a computing system comprising at least a processor, carry out a method comprising:
receiving a dynamic content request;
identifying one or more content classifications of the content;
detecting at least one current trend based on dynamic content request volume (DCRV) in at least one of the one or more content classifications of the content;
in response to the detecting, identifying a set of candidate content portfolios from a plurality of trending content portfolios, with the identifying comprising determining the candidate content portfolios are classified in the one or more content classifications of the content, with the one or more classifications of the content being the one or more classifications upon whose DCRV the at least one current trend is based;
selecting a content portfolio from the set of candidate content portfolios to maximize revenue to be paid in exchange for placing a dynamic content creative for display, wherein each content portfolio of the set of candidate content portfolios includes an indication of a revenue amount to be paid in exchange for placing a dynamic content creative for display, with the selecting comprising determining the revenue amount as a function of at least one characteristic of the at least one current trend;
obtaining a dynamic content creative of the selected content portfolio; and
in response to the dynamic content request, providing information regarding the obtained dynamic content creative in response to the dynamic content request.

12. The one or more computer-readable storage media of claim 11, wherein the selecting comprises determining the revenue amount as a function of a current magnitude of the at least one current trend.

13. The one or more computer-readable storage media of claim 11, wherein the selecting comprises determining the revenue amount as a function of a number of unique users participating in the at least one current trend.

14. The one or more computer-readable storage media of claim 11, wherein obtaining a dynamic content creative of the selected content portfolio comprising obtaining a dynamic content creative from a plurality of dynamic content creatives of the selected content portfolio according to one or more of user demographics, the at least one content classifications, and magnitude of the at least one current trend.

15. The one or more computer-readable storage media of claim 11, wherein detecting the at least one current trend based on the DCRV in at least one of the content classifications of the content comprises determining that the DCRV of at least one content classification for a current trend period exceeds a standard DCRV for the at least one content classification by at least a threshold amount.

16. The one or more computer-readable storage media of claim 15, wherein the threshold amount comprises a predetermined percentage of the DCRV of the at least one content classification for a current time period.

17. The one or more computer-readable storage media of claim 15, wherein the threshold amount comprises a standard deviation from an average of the DCRV of the at least one content classification for a current time period.

18. A dynamic content providing computer system for responding to a dynamic content request in regard to display of content to a user, with the dynamic content providing computer system comprising:
at least one processor; and
memory storing instructions, which when executed by the at least one processor cause the at least one processor to perform acts comprising:
receiving a dynamic content request;
identifying one or more content classifications of the requested content;
detecting a current trend based on a current dynamic content request volume (DCRV) with regard to at least one identified content classifications of the content;
in response to the detecting, identifying a set of candidate content portfolios, with the identifying comprising determining the candidate content portfolios are classified in the one or more content classifications of the content, with the one or more classifications being the one or more classifications upon whose DCRV the current trend is based;
selecting a content portfolio from the set of candidate content portfolios to maximize revenue to be paid in exchange for placing a dynamic content creative for display, wherein each content portfolio of the set of candidate content portfolios includes an indication of a revenue amount to be paid in exchange for placing a dynamic content creative for display, with the selecting comprising determining the revenue amount as a function of at least one characteristic of the current trend;
obtaining a dynamic content creative of the selected content portfolio; and
in response to the dynamic content request, providing information regarding the obtained dynamic content creative in response to the received dynamic content request.

19. The dynamic content providing computer system of claim 18, wherein the detecting of the current trend comprises detecting that the DCRV of the at least one content classification for a current trend period exceeds a standard DCRV for the at least one content classification by at least a threshold amount.

20. The dynamic content providing computer system of claim 18, wherein the acts comprise determining the revenue amount as a function of a current magnitude of the current trend.

\* \* \* \* \*